(12) United States Patent
Pérez-Sánchez et al.

(10) Patent No.: US 9,343,200 B2
(45) Date of Patent: May 17, 2016

(54) ELECTRICAL AND/OR TELECOMMUNICATIONS CABLES WITH RETRO-REFLECTIVE INTEGRAL COVERING FOR USE IN AGGRESSIVE ENVIRONMENTS WITH LITTLE OR ZERO VISIBILTY AND THE METHOD FOR THE PRODUCTION THEREOF

(71) Applicant: SERVICIOS CONDUMEX, S.A. DE C.V., Querétaro, Santiago de Querétaro (MX)

(72) Inventors: Alfonso Pérez-Sánchez, Santiago de Querétaro (MX); Fernando Labastida-Sánchez, Santiago de Querétaro (MX); Sergio Castañeda-Gutiérrez, Santiago de Querétaro (MX); Jonathan Aguilar-Ávila, Santiago de Querétaro (MX)

(73) Assignee: SERVICIOS CONDUMEX, S.A. DE C.V., Querétaro, Santiago de Querétaro (MX)

( * ) Notice: Subject to any disclaimer, the term of this patent is extended or adjusted under 35 U.S.C. 154(b) by 31 days.

(21) Appl. No.: 14/415,445

(22) PCT Filed: Oct. 30, 2013

(86) PCT No.: PCT/IB2013/002417
§ 371 (c)(1),
(2) Date: Jan. 16, 2015

(87) PCT Pub. No.: WO2014/128522
PCT Pub. Date: Aug. 28, 2014

(65) Prior Publication Data
US 2015/0170797 A1     Jun. 18, 2015

(30) Foreign Application Priority Data
Feb. 20, 2013 (MX) .................... MX/a/2013/002017

(51) Int. Cl.
*H01B 7/00* (2006.01)
*H01B 7/295* (2006.01)
(Continued)

(52) U.S. Cl.
CPC ........ *H01B 7/295* (2013.01); *G02B 5/12* (2013.01); *H01B 7/1855* (2013.01); *H01B 7/366* (2013.01); *H01B 13/141* (2013.01); *H01B 7/1875* (2013.01)

(58) Field of Classification Search
CPC .......... H01B 7/361; H01B 7/365; H01B 7/36; H01B 13/341; H01B 7/366
USPC ............. 174/110 R, 112, 113 R, 36, 200, 278
See application file for complete search history.

(56) References Cited

U.S. PATENT DOCUMENTS

| | | | |
|---|---|---|---|
| 3,197,554 A * | 7/1965 | Baker ..................... | H01B 7/365 139/425 R |
| 5,922,996 A * | 7/1999 | Ryeczek ................ | G01K 11/12 116/207 |

(Continued)

*Primary Examiner* — William H Mayo, III
(74) *Attorney, Agent, or Firm* — Browdy and Neimark, PLLC

(57) ABSTRACT

An electric and/or telecommunications cables having retro-reflective integral covers to be used in harsh environments with low or null visibility and the manufacturing process thereof. The cable comprises a core capable of incorporating a plurality of electric and/or telecommunications conductors, reinforcement elements and/or filler elements; a first protective cover layer wrapping the core; at least one reflective tape including visible external light retro-reflective elements, and wrapping the first protective cover layer, which constitutes a second cover layer; and a third protective cover layer wrapping the second cover layer, constituted by the reflective tape having retro-reflective elements and the first protective cover layer.

29 Claims, 7 Drawing Sheets

(51) Int. Cl.
 *H01B 7/36* (2006.01)
 *G02B 5/12* (2006.01)
 *H01B 13/14* (2006.01)
 *H01B 7/18* (2006.01)

(56) References Cited

U.S. PATENT DOCUMENTS

| | | | | |
|---|---|---|---|---|
| 6,906,264 B1 * | 6/2005 | Grant, Jr. | ............ | H02G 3/0468 174/102 D |
| 7,468,489 B2 * | 12/2008 | Alrutz | ............ | H01B 7/366 174/112 |
| 7,812,259 B2 * | 10/2010 | Agan | ............ | H01B 7/368 174/112 |
| 2002/0185299 A1 * | 12/2002 | Giebel | ............ | G02B 6/4482 174/110 R |
| 2008/0277138 A1 * | 11/2008 | Gallens | ............ | D07B 1/148 174/111 |
| 2009/0114418 A1 * | 5/2009 | Smith | ............ | G06F 3/00 174/112 |
| 2009/0188694 A1 * | 7/2009 | Pereira | ............ | H02G 3/0468 174/112 |
| 2011/0220386 A1 * | 9/2011 | Temblador | ............ | G06Q 50/04 174/102 C |
| 2015/0179307 A1 * | 6/2015 | Ranganathan | ............ | H01B 7/36 174/113 R |

* cited by examiner

ELECTRICAL AND/OR TELECOMMUNICATIONS CABLES WITH RETRO-REFLECTIVE INTEGRAL COVERING FOR USE IN AGGRESSIVE ENVIRONMENTS WITH LITTLE OR ZERO VISIBILTY AND THE METHOD FOR THE PRODUCTION THEREOF

FIELD OF THE INVENTION

The present invention is related to techniques for manufacturing electric and/or telecommunications cables for the extractive and construction industries, and more specifically, it is related to electric and/or telecommunications cables with integral retro-reflective covers used in harsh environments with low or null visibility, and the manufacturing process thereof.

BACKGROUND OF THE INVENTION

In facilities having extremely harsh working conditions, such as in the extractive industries (mainly the mining industry), as well as in the construction industry, the frequent mechanical abuse to elements conducting electrical and/or telecommunications signals found in low or null lighting areas is well known. The above makes the elements having a cover without a fast and easy visualization effect, since they cannot be seen, to be exposed to hits, crushings, or other damages due to the severe operation conditions where they are placed.

To solve the issues in extremely harsh environments such as mines, there are cable covers classified by the applicable product standards such as heavy-duty (HD) and extra heavy-duty use (XHD). In facilities such as mines, based on the cable gauge as an end-product, and the destined environment, the external cover can be manufactured with abrasion resistant materials such as CPE (chlorinated polyethylene), CR (Polychloroprene), CSM (chloro-sulphonated Polyethylene), NBR-PVC (Acrylonitrile butadiene-styrene/Polyvinyl chloride) and TPU (thermoplastic Polyurethane).

Likewise, there are other application fields with less resistance requirements for energy and/or telecommunications cable covers with respect to resistance due to mechanical abuse. For these applications, materials used defined by the different product standards include, but are not limited to, materials such as PE (polyethylene), PA (polyamides), PP (polypropylene), PVC (Polyvinyl chloride) and Polyester as the mainly used polymeric compounds.

In the prior art, there are several alternatives of materials for energy and/or telecommunications cable covers, which try to solve the low or null visibility of the cover of these cables once installed in harsh and low or null lighting environments.

In Patent Application WO 00/30126, an option for a mechanical reinforcement for cables is disclosed, consisting of external application of a urethane-based material on the above-mentioned extra heavy-duty cover materials. Applying a urethane-based coating offers a higher abrasion resistance; furthermore, this coating is transparent, such that it allows seeing the cover color of the cable desired to be protected; however, this solution does not consider the use of luminescent materials to give the cable better visibility.

On the other hand, in Patent Application WO 82/03942 a way to solve the visibility of energy transmitting cables used in the mining industry is disclosed, which consists in the application of a continuous reflective tape applied on the cable cover before this is subjected to a vulcanization process, then the reflective tape remains embedded in the external part of the cover by a process including encapsulating the whole cable under a melted lead covering, thereby the cover is vulcanized and the lead is subsequently withdrawn thus leaving the reflective strip embedded in the already vulcanized rubber covering (reticulated).

Similarly, in U.S. Patent Application 20100282491 the application of an extruded cover of fluorescent material on the conductor bundle (core) of the cable pretended to be protected is described, and on this first layer, a second layer made of a light-transmitting thermoplastic polyurethane (TPU) surrounding the first layer is deposited. This solution is not as good when the TPU material must be flame resistant, since the additives employed to give this resistance cause the second layer to have an opaque natural color, limiting the brightness effect of the inner layer. An embodiment described in this very patent application consists in the application of a layer arranged between the first layer and the external layer of TPU material, such that the application of the intermediate layer may be a reinforcing mesh with empty spaces such that it allows visualizing the first layer. In both embodiments in this patent, the first layer may be a tape having a fluorescent external covering wrapping the conductor bundle remaining under the cover.

In Patent Application WO 2010 131084, an external cover of a fluorescent pigments material is described, being mentioned that this cover has a drawback related to low durability of the fluorescent pigments, due to exposure to the working environment, i.e., to the air, water, soil and ultraviolet light (UV rays) conditions the external cover is exposed to. In the same document, as a solution to the above problem the use of a reflective tape arranged helically on the cable external cover is suggested. The defect of this solution is that the reflective tape is easily destroyed as a result of severe handling or abrasive environments. Another embodiment set forth is the application of fluorescent tapes, reflective tapes or a combination thereof, helically arranged on the conductor or the conductor bundle, wherein the tapes are protected by deposition of a light-transmitting thermoplastic Polyurethane (TPU) layer surrounding the first layer. This solution is limited when the TPU material must be flame resistant, since the additives used to give this resistance turn the second layer to an opaque natural color, considerably limiting the brightness effect of the inner layer. It also has the drawback that the light-transmitting TPU material turns opaque by the aging effect of the material.

In the same document WO 2010 131084, it is set forth that a first layer consisting of a luminescent tape or polymeric reflective material is deposited on the conductor or conductor bundle, and onto the latter, add a second layer consisting of transparent polyesther tapes, which protect the luminescent or reflective tapes during the application of the last cover layer consisting of a light-transmitting thermoplastic polyurethane (TPU). Whereby in this solution there is no adherence between the first and third layers, then, it cannot be considered as an integral cover. Additionally, any departure from the application process of this configuration may cause loss of the polyester layer coating, resulting in the TPU material being in contact with the first layer; and, therefore, its capability of luminescence or reflectance may be exhausted.

On the other hand, in the Utility Model Registration Application CN201886811U a conductor or conductor bundle is described onto which a layer of material meeting the mechanical, chemical and electrical requirements as a cover for an electric cable product is applied. Over this layer, a helical reflective tape with covering spaces from 30% to 60% is applied, which is protected by a thin TPU layer having thicknesses from 0.5 mm to 1.2 mm, and which function is to protect the reflective tape. This solution to the visibility of electric cables in dark environments has the drawback that the reflective tape used is applied as an add-on to the finished cable, then, it results in a cable to which a reflective tape which needs to be protected by a layer of a TPU material is applied with a non-exceeding thickness of 1.2 mm to allow visibility of the reflective tape. The TPU adhesion means on the applied reflective tape do not constitute an integral cover with reflective elements forming part of the same cover, rather being add-on elements installed on the cover.

In U.S. Patent Application 20020012795A1 a wiring to which a helical or longitudinal tape of opaque enough material is applied is disclosed, with at least one light reflective effect face, such that it covers 100% of the core it is applied on. A transparent compound is applied on this reflective tape by means of extrusion, typically from PVC, or a pigment may be used on this external layer, which should be translucent to allow seeing the reflective layer coaxially arranged on the core. This solution has limited applications, since direct lightings are required for the light to reflect, also, the mechanical properties of the PVC cover are not proper to be used in harsh environments. It is worth mentioning that this document does not cover applications in electric or telecommunications cables.

Finally, in U.S. Pat. No. 6,660,378B2 a light duty wiring is described, such as that used for animal leashes, pedestrian crossing signals, restraining walls, etc., to which an inner layer wrapping the wiring is applied, and above this layer, a layer having a sensitively lower thickness than the first layer (coating) is applied, which is formed of a resilient polymer with a dark glowing material, which is pulverized for its dispersion in the coating layer. The inner layer has a luminous color, or a reflective surface such that the largest portion of light incident on this cable is reflected, having the great defect that this solution is for a low harsh environment use. As the above document, this document does not cover applications in electric or telecommunications cables.

As it may be seen, in the state of the art the use of reflective materials to coat electric cables conducting electric and/or telecommunications signals is disclosed; however, the reflective materials described in the prior art have the defect of not solving the poor or null visibility of these cables covers in a proper manner once installed in harsh environments and with low or null lighting, added to the fact that they do not form an integral protection cover.

Due to the above, it has been sought to suppress the objections found in the state of the art by means of the development of electric and/or telecommunications cables having retro-reflective integral covers for use in harsh environments with low or null visibility, and the manufacturing process thereof.

OBJECTS OF THE INVENTION

Considering the defects of the previous techniques, it is an object of the present invention to provide electric and/or telecommunications cables having retro-reflective integral covers to be used in harsh environments with low or null visibility and the manufacturing process thereof, which allows the cables to be visualized in dark environments by the retro-reflective effect.

Another object of the present invention is to provide electric and/or telecommunications cables having retro-reflective integral covers to be used in harsh environments with low or null visibility and the manufacturing process thereof, which allows the application of reflective tapes having retro-reflective elements in a protective cover (integral retro-reflective cover), for any cable arrangements type including a core conducting energy and/or telecommunications signals and a protective cover.

An additional object of the present invention is to provide electric and/or telecommunications cables having retro-reflective integral covers to be used in harsh environments with low or null visibility and the manufacturing process thereof, which allows to carry out the process of incorporating the reflective tapes with retro-reflective elements to the cable cover in a practical and continuous manner without modifying the physical properties of the materials being incorporated.

It is a further object of the present invention to provide electric and/or telecommunications cables having retro-reflective integral covers to be used in harsh environments with low or null visibility and the manufacturing process thereof, which allows the application of the reflective tapes with retro-reflective elements in an integral manner to the protective covers of the energy and/or telecommunications cables.

Another object of the present invention is to provide electric and/or telecommunications cables having retro-reflective integral covers to be used in harsh environments with low or null visibility and the manufacturing process thereof which allows to obtain an electric and/or telecommunications cable with a protective cover which includes reflective tapes with retro-reflective elements, to protect the inner elements that are used for the conduction of energy and/or telecommunications signals in an electric and/or telecommunications conductors array, and thus to avoid interruptions in the conduction of signals or energy, because of involuntary damages caused by a lack of visualization due to the harsh environment or severe handling in the working areas where they are installed.

BRIEF DESCRIPTION OF THE INVENTION

The present invention is related to electric and/or telecommunications cables having retro-reflective integral covers to be used in harsh environments with low or null visibility, which are capable of being visualized in dark environments by effect of the visible light retro-reflectance.

Electric and/or telecommunications cables of the present invention include a core capable of incorporating a plurality of electric and/or telecommunications conductors, reinforcement elements and/or filler elements; a first protective cover layer wrapping the core; at least one reflective tape including visible external light retro-reflective elements and wrapping the first protective cover layer, which constitutes a second cover layer; and, a third protective cover layer wrapping the second cover layer, constituted by the tape having retro-reflective elements, and the first protective cover layer.

The reflective tapes with retro-reflective elements employed include reflective high bright micro-prisms placed on a tape conformation base, where the micro-prisms are encapsulated by a transparent film of thermoset or thermoplastic polymers, which may be from distinct polymeric bases such as vinyl-based aromatic syndiotactic polymers, urethanes, acrylics, ethylene-acrylic ethyl copolymers, polyesthers or fluoropolymers. The encapsulating film works as a protective layer for the reflective micro-prisms producing the retro-reflection effect, and also the encapsulating film serves as a filler for the hollow spaces between the micro-prisms internal faces.

Likewise, a process is described to manufacture, in a practical and continuous manner, without modifying the physical properties of the constituting materials, the electric and/or telecommunications cables having retro-reflective integral covers to be used in harsh environments with low or null visibility.

The process to manufacture the electric and/or telecommunications cables having retro-reflective integral covers to be used in harsh environments with low or null visibility consists in applying by polymer extrusion, a first inner protective cover layer, with transparent color or opaque or any translucent solid color on an electric power cable bundle and/or on a telecommunications cable bundle.

Once the first layer is extruded, a second layer is directly applied on it, consisting of at least one reflective tape including the visible external light retro-reflective elements, said tapes may or may not include one or more chromatic forms and shades. The tapes are composed by reflective micro-prisms distributed on its surface, covered with a protective layer of different polymeric bases as above-mentioned and which encapsulate the micro-prisms arranged on these tapes. In a preferred embodiment, the reflective tape is applied in a helically manner.

Finally, on the tapes a third protective cover layer from transparent polymers is applied by extrusion.

The final result is a retro-reflective integral cover having non-distinct physical properties among the integral cover produced with retro-reflective elements, compared to those monolayer extruded polymer covers as protective covers for electric power and/or telecommunications cables, such that said electric and/or telecommunications cables having covers incorporating retro-reflective elements, retain their physical properties while using this kind of elements.

In addition, engraved retro-reflecting tapes may be used, thus allowing a better retro-reflective coefficient from any lighting incidence angle, and further, a diversity of chromatic shades in the retro-reflective tapes and the shape-effects caused by the engraving, allow to associate the class of cable with the retro-reflectance in diverse colors and configurations, to a code of cover colors to be defined in terms of their application.

BRIEF DESCRIPTION OF THE DRAWINGS

The novel aspects considered characteristic of the present invention will be established particularity in the appended claims. However, some embodiments, characteristics and some objects and advantages thereof will be better understood from the detailed description, when read in connection with the appended drawings, wherein:

DETAILED DESCRIPTION OF THE INVENTION

Figure 1:
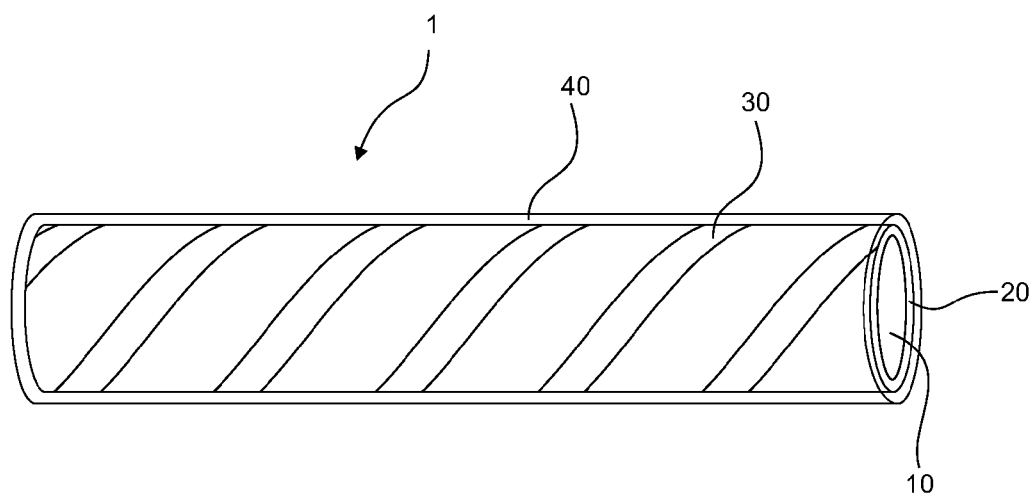
FIG. 1 is a perspective view of an arrangement of an electric and/or telecommunications cable arrangement having retro-reflective integral covers to be used in harsh environments with low or null visibility, built according to the principles of a preferred embodiment of the present invention.

The retro-reflectance effect consists in the incidence of electromagnetic radiation into elements reflecting a radiation beam towards the source where it is generated, in a parallel direction toward the incidence beam, this vectorial parallel reflection occurs even at lighting angles lower than 0° (zero degrees). Micro-prisms placed on a surface are the employed elements to perform this effect in the present invention, which are commonly referred to as "retro-reflectors" although they are also known as "retroflectors" and/or "cataphotos". The reflection effect in the retro-reflectors is different from the reflection in planar mirrors, since in the latter the reflection is emitted to the transmitter if, and only if, the incidence angle equals 0°.

The electric and/or telecommunications cable covers are manufactured employing polymeric materials which may be thermoplastic, thermosetting or elastomers and thermoplastic elastomers, and its election is in terms of the product standard governing the electric and/or telecommunications cable. Moreover, thermoplastic elastomers used to manufacture some electric and/or telecommunications cables, are also known as TPE or thermoplastic rubbers, and they are a type of copolymers or a physical mixture of polymers (generally a thermoplastic and a thermosetting or elastomer) resulting in materials with thermoplastic and elastomeric characteristics. While the majority of elastomers are reticulated, and therefore thermoset and they cannot be processed again once vulcanized, thermoplastic elastomers are, in turn, relatively easy to process and reuse through the common processes of plastic-molding, for example, extrusion, injection, rotomolding, etc.; thermoplastic elastomers combine the typical advantages of the reticulated elastomers and those of thermoplastic materials.

The main difference between the thermosetting elastomers and the thermoplastic elastomers is the type of cross-linking in their structures, i.e., while the cross-linking in thermostable polymers is formed by covalent bonds created during the vulcanization process, the cross-linking in thermoplastic elastomers is formed from weak dipoles or from hydrogen bridge bonds, and it occurs in one phase of the material only.

Six types of thermoplastic elastomers may be commercially considered: styrenic block copolymers, polyolefins mixtures, elastomeric alloys, thermoplastic polyurethanes, thermoplastic copolyesther and polyamide-polyether copolymers.

Thermoplastic polyurethane is one of the existing varieties within polyurethanes. It is a straight, non-crosslinked elastomeric polymer and, then, it is thermoplastic. This elastomer can be formed by common thermoplastic processes, such as injection, extrusion, and blow-molding. It is commonly referred to as TPU (TPU, Thermoplastic Polyurethane). Thermoplastic polyurethane is characterized by its high abrasion, wear, tearing, oxygen, ozone and low temperatures resistance. This combination of properties makes the thermoplastic polyurethane an engineering plastic; due to this, it is used in special applications. Thermoplastic polyurethane is formed by the reaction of three main raw materials, which are:
  a. Polyols (long chain diols)
  b. Diisocyanates
  c. Short chain diols TPUs, as all common thermoplastics, may also contain additives or fillers to achieve special properties: plastifiers, flame-retardants, fibers, etc. TPU does not require vulcanization for its processing, although in 2008 a novel reticulation process thereof was introduced to reticulate it if necessary.

The present invention is related to electric and/or telecommunications cables having retro-reflective integral covers to be used in harsh environments with low or null visibility, which are capable of being visualized in dark environments by the effect of the visible light retro-reflectance, by the use of retro-reflective tapes including high bright reflective micro-prisms placed on a tape conformation base, wherein the micro-prisms are encapsulated in a thermosetting or thermoplastic polymer transparent film, which may be from different polymeric bases such as vinyl-based aromatic syndiotactic polymers, urethanes, acrylic, ethylene-ethyl acrylate copolymers, polyesters or fluoro-polymers.

The encapsulating film works as a protective layer for the reflective micro-prisms producing the retro-reflection effect, and the encapsulating film also serves as a filler of the hollow spaces between the micro-prisms inner faces. The obtained tapes may have one or more chromatic shades, may contain graphics, symbols or some indication denoting the type of tape employed, in order to obtain the best retro-reflectance coefficient together with the micro-prisms in any visible light incident angle and to obtain specific identification of the class of cable associated to the visible chromatic shades.

Likewise, the process to manufacture the retro-reflective integral covers of the electric and/or telecommunications cables for use in harsh environments with low or null visibility in a practical and continuous manner, without modifying the physical properties of the constituting materials is described.

The manufacturing process for the electric and/or telecommunications cables having retro-reflective integral covers to be used in harsh environments with low or null visibility, consists in the extrusion application of a polymeric composition forming a first inner protective cover layer with transparent color or opaque or translucent solid color on an electric power cable bundle and/or on a telecommunications cable bundle.

The polymeric composition of the first protective cover layer, depending on the application and the corresponding standard, is selected from CPE (chlorinated polyethylene), CR (Polychloroprene), CSM (chloro-sulphonated Polyethylene), NBR-PVC (Acrylonitrile butadiene-styrene/polyvinyl chloride), TPU (thermoplastic Polyurethane), PE (polyethylene), PP (polypropylene), and/or PVC (Polyvinyl Chloride).

Once the first layer is extruded, a second layer is directly applied on it, consisting of at least one reflective tape including the visible external light retro-reflective elements, said tapes may or may not include one or more chromatic shades. The tapes are composed by reflective micro-prisms distributed on its surface, covered with a protective layer of different polymeric bases as above-mentioned and which encapsulates the micro-prisms arranged on these tapes.

Finally, after the application of the retro-reflective tapes, a third cover layer protecting the transparent or translucent polymers is applied by extrusion, such that this third cover layer remains in direct contact on the first cover layer and at the same time in direct contact on the second cover layer.

The final result is a retro-reflective integral cover having non-distinct physical properties among the integral cover produced with retro-reflective elements, compared to those monolayer extruded polymer covers as protective covers for electric power and/or telecommunications cables, such that said electric and/or telecommunications cables having covers incorporating retro-reflective elements, retain their physical properties while using this kind of elements. In addition, engraved retro-reflecting tapes may be used, thus allowing a better retro-reflective coefficient from any lighting incidence angle, and further, a diversity of chromatic shades in the retro-reflective tapes and the shape-effects caused by the engraving, allow to associate the class of cable with the retro-reflectance in diverse colors and configurations, to a code of cover colors to be defined in terms of their application.

The reasoning for the use of this type of covers in the present invention, has been the fact that they have application as protective covers of any kind and construction of cores or cable bundles, which are employed as electric energy and/or telecommunications cables on which this type of cover will be applied to, in facilities with extremely harsh environments, where the mechanical abuse in infrastructures with low or null lightning makes the elements with a non-luminescent cover by not being seen, be exposed to hits, crushings or other damages by the conditions of the place they are positioned in.

Added to the above, cables in the majority of facilities lack any media allowing their fast and precise identification when an eventual cable failure occurs, then, visually non-distinguishable covers, when need to be replaced, are subjected to confusions if there are similar cable configurations and diameters laid out, therefore, the various chromatic and shape-effect identification combinations will enable an efficient identification of the cable line to be revised for reinstatement or replacement.

To solve the issues in extremely harsh environments such as mines, there are cable covers classified by the applicable product standards such as the heavy-duty (HD) and extra heavy-duty use (XHD). In facilities such as mines, based on the gauge of the cable as end-product and on the destined environment, the external cover can be manufactured with abrasion resistant materials such as CPE (chlorinated polyethylene), CR (Polychloroprene), CSM (chloro-sulphonated Polyethylene), NBR-PVC (Acrylonitrile butadiene-styrene/Polyvinyl chloride) and TPU (thermoplastic Polyurethane).

On the other hand, with respect to the applications where the resistance requirements for the energy and/or telecommunications cable covers are less regarding the resistance to mechanical abuse, materials defined by different product standards depending on the environment of application can be used as an additional embodiment of the present invention.

Useful materials may be selected from, but not limited to, PE (polyethylene), PA (polyamides), PP (polypropylene), PVC (Polyvinyl chloride) and Polyester. These materials have a transparent or translucent physical property, which enables to properly see the reflective tape having retro-reflective elements.

Figure 2:
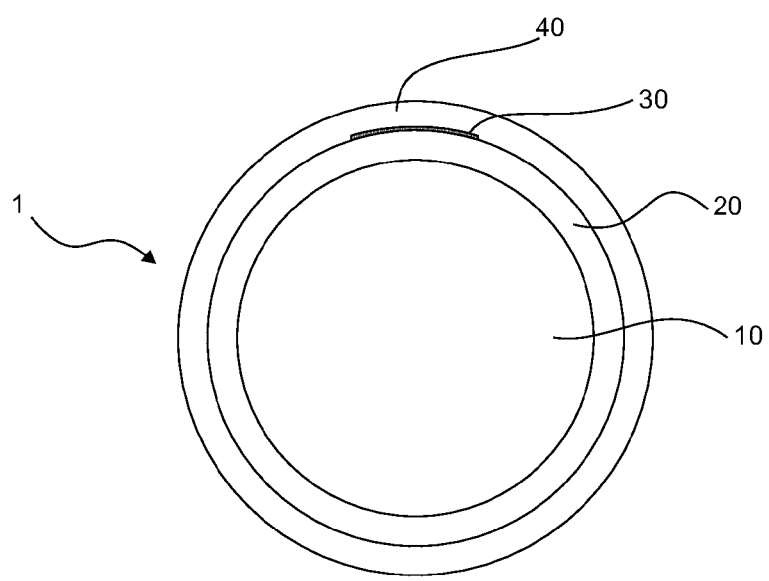
FIG. 2 is a front view of the electric and/or telecommunications cable arrangement having retro-reflective integral covers to be used in harsh environments with low or null visibility shown in FIG. 1.

Referring now to the appended drawings, and more specifically to the FIGS. 1 and 2 thereof, an electric and/or telecommunications cable 1 is shown including a core 10 capable of incorporating a plurality of electric and/or telecommunications conductors, reinforcing elements and/or filler elements; a first protective cover layer 20 wrapping the core 10; at least one reflective tape 30 including visible external light retro-reflective elements and wrapping the first protective cover layer 20, thereby constituting a second cover layer; and, a third protective cover layer 40 wrapping both the second cover layer, constituted by the tape 30 having retro-reflective elements, and the first protective cover layer 20.

The first protective cover layer 20 in the embodiment being described consists of a first layer of TPU material, which may be transparent or of any solid color, which is applied by extrusion onto the core 10. Over this first protective cover layer 20, the reflective tape 30 is directly and helically applied, which includes the retro-reflective elements, such that empty spaces are formed between each section of tape or track, thereby conforming the second cover layer. Over the tape 30 having the retro-reflective elements, and the first protective cover layer 20, the third protective cover layer 40 is applied, which in the present embodiment being described, is an extruded layer from transparent TPU material, such that once extruded, allows visibility of the first protective cover layer 20 and of the second cover layer 30, wherein the thickness of the third layer 40 represents at least 50% of the total thickness of the integral cover formed by the first, second and third cover layers 20, 30 and 40, respectively.

The first protective cover layer 20, the second cover layer 30 constituted by at least one tape having retro-reflective elements, and the third protective cover layer 40, once extruded, form together an integral cover surrounding the core 10.

Figure 3:
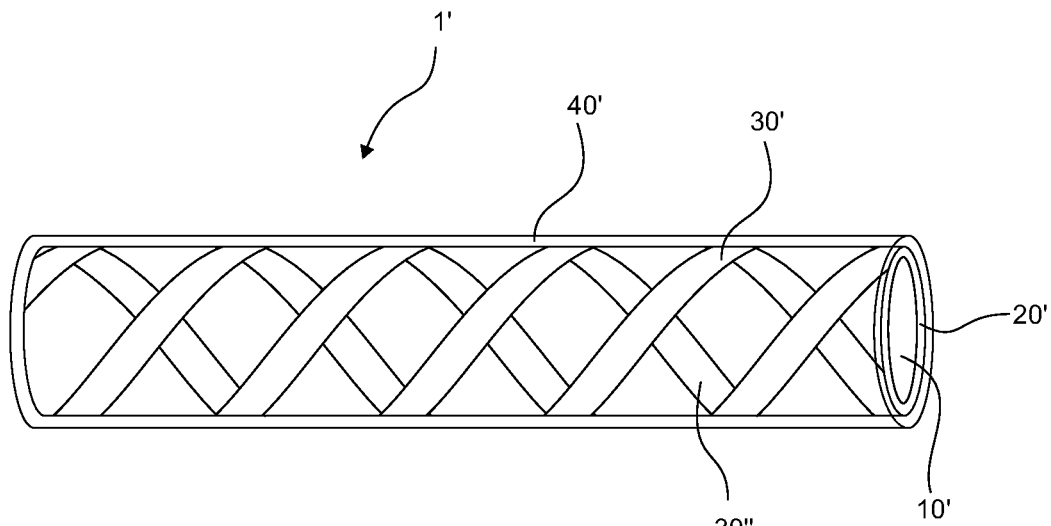
FIG. 3 is a perspective view of an electric and/or telecommunications cable arrangement having retro-reflective integral covers to be used in harsh environments with low or null visibility, built according to an additional embodiment of the present invention.
Figure 4:
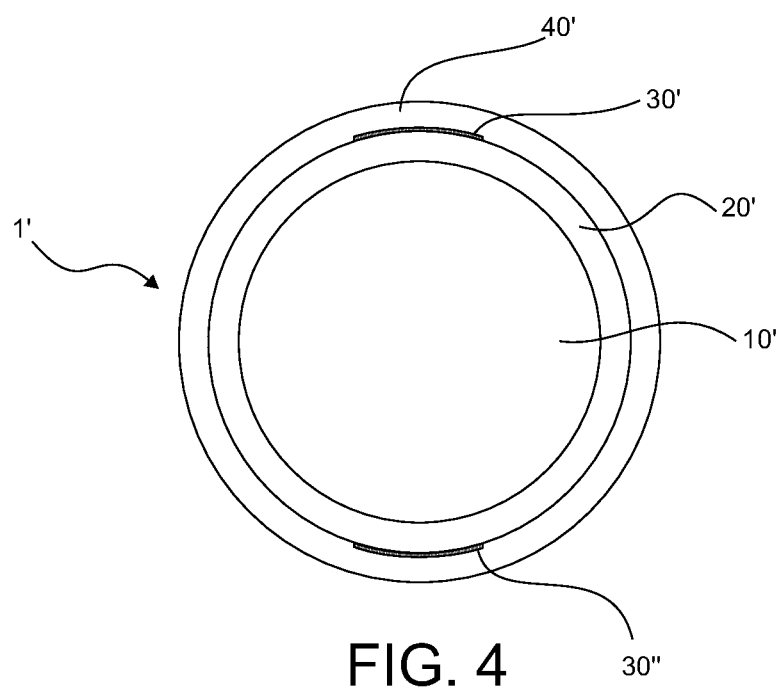
FIG. 4 is a front view of the electric and/or telecommunications cable arrangement having retro-reflective integral covers to be used in harsh environments with low or null visibility shown in FIG. 3.
Figure 5:
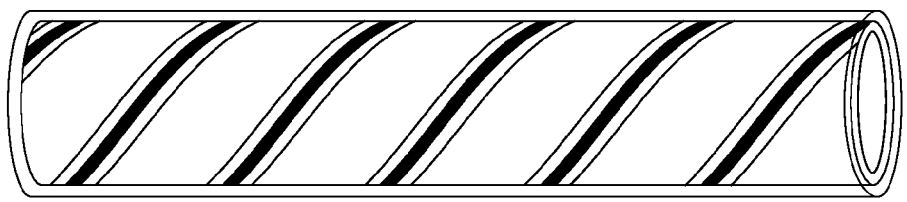
FIG. 5 is a perspective view of an electric and/or telecommunications cable arrangement having retro-reflective integral covers to be used in harsh environments with low or null visibility, built according to a third additional embodiment of the present invention.
Figure 6:
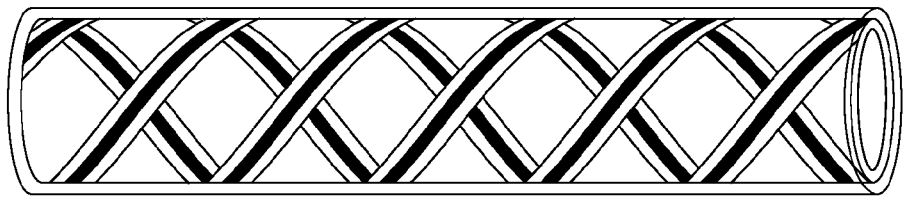
FIG. 6 is a perspective view of an electric and/or telecommunications cable arrangement having retro-reflective integral covers to be used in harsh environments with low or null visibility, built according to a fourth additional embodiment of the present invention.
Figure 7:
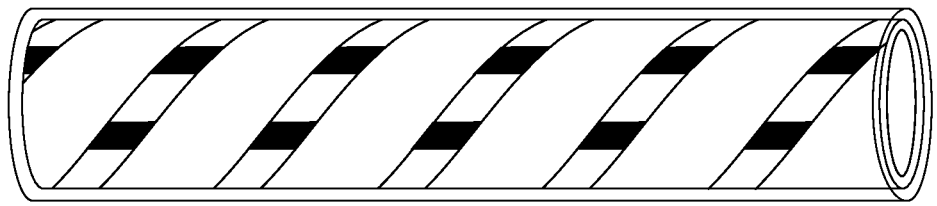
FIG. 7 is a perspective view of an electric and/or telecommunications cable arrangement having retro-reflective integral covers to be used in harsh environments with low or null visibility, built according to a fifth additional embodiment of the present invention.
Figure 8:
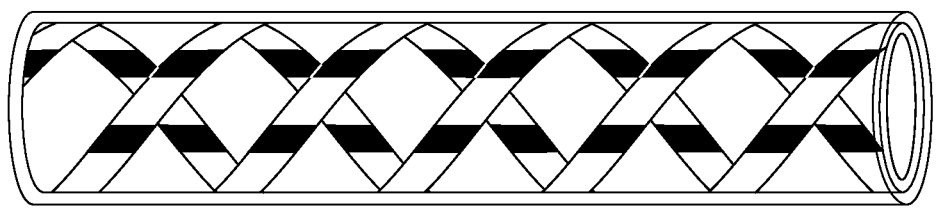
FIG. 8 is a perspective view of an electric and/or telecommunications cable arrangement having retro-reflective integral covers to be used in harsh environments with low or null visibility, built according to a sixth additional embodiment of the present invention.
Figure 9:
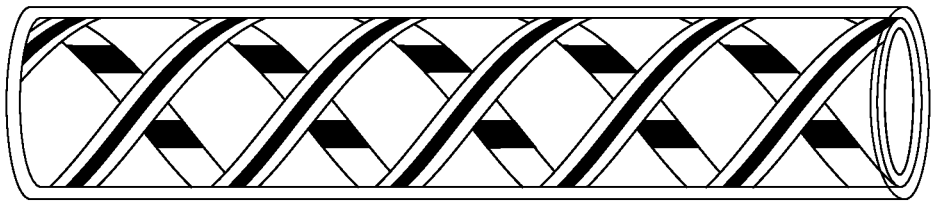
FIG. 9 is a perspective view of an electric and/or telecommunications cable arrangement having retro-reflective integral covers to be used in harsh environments with low or null visibility, built according to a seventh additional embodiment of the present invention.
Figure 10:
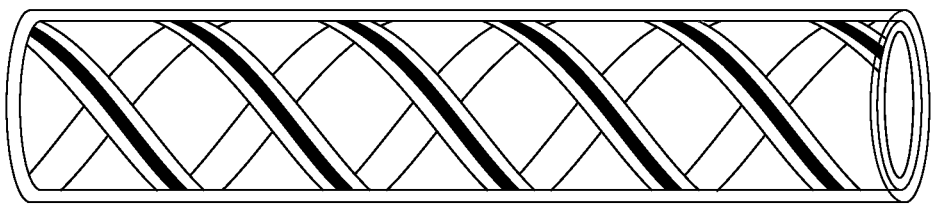
FIG. 10 is a perspective view of an electric and/or telecommunications cable arrangement having retro-reflective integral covers to be used in harsh environments with low or null visibility, built according to an eighth additional embodiment of the present invention.

Referring to FIGS. 3 and 4, an electric and/or telecommunications cable 1' is shown including a core 10' capable of incorporating a plurality of electric and/or telecommunications conductors, reinforcing elements and/or filler elements; a first protective cover layer 20' wrapping the core 10'; a pair of reflective tapes 30' and 30" including visible external light retro-reflective elements and wrapping the protective cover 20', the reflective tapes 30' and 30" constituting a second cover layer; and, a third protective cover layer 40' wrapping both the second cover layer constituted by the reflective tapes 30' and 30", having retro-reflective elements, and the first protective cover 20'.

The first protective cover layer 20' in the additional embodiment being described consists of a first layer of TPU material, which may be transparent or of some solid color, which is extrusion applied onto the core 10'. Over this first protective cover layer 20' the pair of reflective tapes 30' and 30" is directly applied, which includes the retro-reflective elements, helically and counter-currently arranged, such that they crossover each other on the first protective cover 20', so empty spaces between each section of tape or track are formed and which constitute the second cover layer. Over the reflective tapes 30' and 30" having retro-reflective elements and the first protective cover layer 20' the third protective cover layer 40' is applied, which in the present embodiment being described, is an extruded layer of transparent TPU material, such that once extruded, it allows visibility of both the first protective cover layer 20' and the second cover layer, formed by the reflective tapes 30' and 30", where the thickness of the third layer 40' represents at least 50% of the total thickness of the integral cover formed by the first, second and third cover layers 20'; 30' and 30"; and, 40'; respectively. This embodiment renders a cable with an integral cover showing chromatic and visibility effects clearly differentiated with respect to the embodiment of the cable with an integral cover containing a single reflective tape helically applied and non-crossed over.

The first protective cover layer 20', the second cover layer constituted by the reflective tapes 30' and 30" having retro-reflective elements and the third protective cover layer 40', once extruded, form together an integral cover surrounding the core 10'.

It is worth mentioning that the present invention envisages diverse embodiments of arrangements in the application forms of the reflective tape(s) having retro-reflective elements, and in the continuity of the chromatic shades thereof, as is shown in FIGS. 1, 3, 5, 6, 7, 8, 9, 10 and 11.

The application of the reflective tapes 30 or 30' and 30" including the retro-reflective elements on the first protective cover layer 20 or 20' respectively, can be in a helically or helically crossover manner, as is shown in FIGS. 1 and 3, or in addition, in a continuous longitudinal or intermittent manner with alternated and defined areas on the first protective cover layer 20 or 20', or in addition, by means of any another arrangement assuring they could be seen at the same deposition level as the first protective cover layer, before the third protective cover layer 40 or 40' is applied by extrusion.

Likewise, the tape configuration may adopt different variations in the continuity of the chromatic shades of the retro-reflective elements, just as they are indicated in Table I:

TABLE I

Variations in chromatic shades continuity in the retro-reflective tape and in its application form, to the retro-reflective cable integral cover.

| FIG. | Core [10 and 10'] | First layer [20 and 20'] | Second layer Reflective Tape having retro-reflective elements [30, 30' and 30"] | Third layer [40 and 40'] |
|---|---|---|---|---|
| 3 | Mono-conductor or Conductors bundle | solid color TPU or Translucent color TPU | 1 monochromatic tape helically applied 2 monochromatic tapes helically applied and crossing over each other | Transparent color TPU |

TABLE I-continued

Variations in chromatic shades continuity in the retro-reflective tape and in its application form, to the retro-reflective cable integral cover.

| FIG. | Core [10 and 10'] | First layer [20 and 20'] | Second layer Reflective Tape having retro-reflective elements [30, 30' and 30''] | Third layer [40 and 40'] |
|---|---|---|---|---|
| 5 | | or Transparent color TPU | 1 tape with two continuous chromatic shades, helically applied | |
| 6 | | | 2 tapes with two continuous chromatic shades, helically applied and crossing over each other | |
| 7 | | | 1 tape with two intermittent chromatic shades, helically applied | |
| 8 | | | 2 tapes with two intermittent chromatic shades, helically applied and crossing over each other | |
| 9 | | | 1 tape with two intermittent chromatic shades and 1 tape with two continuous chromatic shades, helically applied and crossing over each other | |
| 10 | | | 1 monochromatic tape and 1 tape with two continuous chromatic shades, helically applied and crossing over each other | |
| 11 | | | 1 monochromatic tape and 1 tape with two intermittent chromatic shades, helically applied and crossing over each other | |

Figure 12:
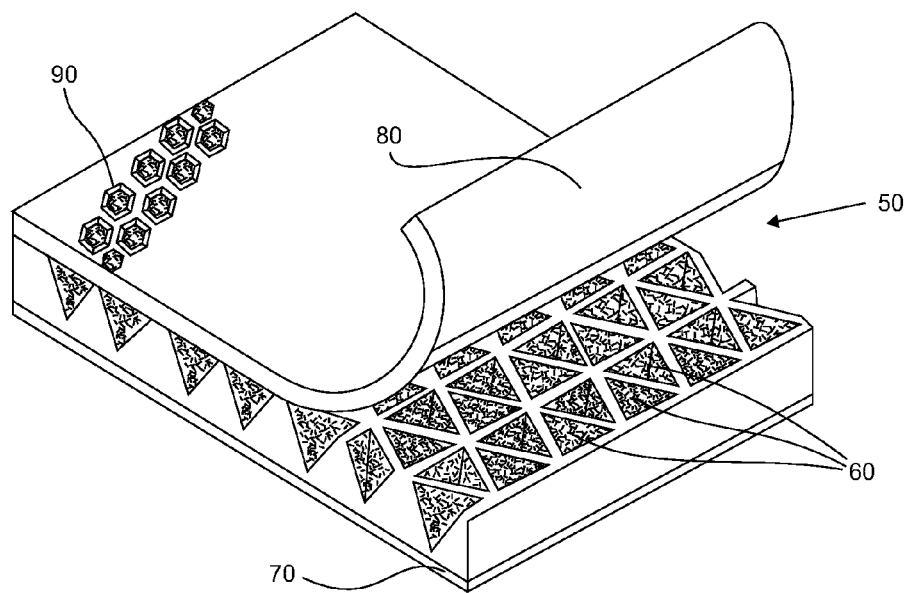
FIG. 12 is a perspective view of a plurality of retro-reflective elements disposition in a tape substrate.
Figure 13:
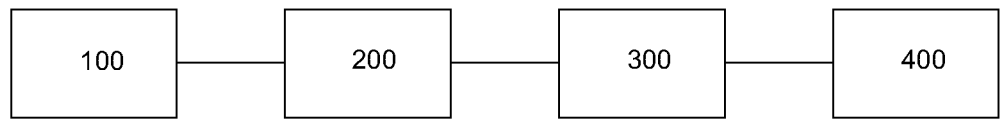
FIG. 13 is a block diagram of a process to manufacture an electric and/or telecommunications cable having integral retro-reflective covers, according to a preferred embodiment of the present invention.

Referring to FIG. 12, the structure of a reflective tape 30, 30' or 30'' is shown, having retro-reflective elements, such as the one manufactured by 3M under the trade mark HIGH GLOSS, which consists of a tape 50 supporting a plurality of micro-prisms 60 with chromatic shade, the tape 50 is encapsulated at the lower side with a transparent polymeric cover 70 and on the top side with a transparent polymeric cover 80 which in turn fills the micro-prisms voids and serves as an inner support therefor. Engraving 90 may be formed at the external surface of the transparent polymeric cover 80, by means of screen printing, or another printing method not damaging the micro-prisms 60.

One application of this type of covers supporting the present invention is shown below, as an example, since the protective cover for energy and/or telecommunications cables has as main object to protect the inner energy or signals conductive elements, to avoid interruptions resulting from harsh environments and/or a severe management in the areas where the cables are installed.

Energy cables and telecommunications cables include one or more conductive elements, which are isolated and covered by an external layer. An energy cable is formed by one or more electric conductive elements, which are isolated and wired together (bundled). A telecommunications cable is formed by conductive elements wired together, of relatively smaller size than the energy cables, which purpose is to transmit electric signals, an option in telecommunications cables is the use of optic fiber to transmit optical signals.

One of the environments where this type of cables is placed and which better represents the low or null lightning conditions, harsh conditions of use, and fast and easy identification installation and requirements of the cables is in mines, where the cables are subjected to severe abrasion due to the effects of the employed equipment and machinery, vehicle and people traffic, falling downs, among others; in addition, the low visibility of the cable in dark conditions makes them especially susceptible to located crushing or abrasion resulting from the stepping of heavy machinery; further, if there is a case where the identification of cable failures is required, the maintenance personnel have to follow the wiring in harsh conditions, and in the case of two or more cables, when identifying the cables the confusion is high, therefore, in addition to the visibility by retro-reflection, the chromatic combination of the retro-reflective elements will allow an efficient identification of the cable being revised.

In a preferred embodiment, the technical solution proposed by the present invention consists in the application of a first protective cover layer of an extruded polymeric material, either of transparent or any solid color, or translucent, such that a first inner cover layer is formed on the cable bundle.

Then, on this first protective cover follows the application of a second cover layer constituted of at least one tape having retro-reflective elements in an helical form, which has a syndiotactic polymer coating at the front and back sides, providing non-slipping electrostatic adhesion with no adhesives needed for its fixing on the first TPU layer, while protecting from high temperature and pressure caused by the extrusion deposition of the transparent polymeric material external layer.

The tape with retro-reflective elements may be of a unique color, of intermittent chromatic effects on each tape, or of dual-tape in a crossover mesh shape, such that empty spaces exist on the surface of this second cover layer, exposing the polymeric material constituting the first cover layer to visually identify this inner layer, such that the reflective tape coating having retro-reflecting elements occupies up to 91% of the surface being deposited on, in such manner that the minimum empty space for close contact between the first cover layer and the third cover layer is half the first layer external surface. Distance between tracks may be of at least 20% of the width of the applied tape, the above is known as discontinuity percentage.

Finally, a third protective cover layer or external layer of transparent polymeric material is applied, extruded under high pressure (high adherence extrusion), conductor of the visible light in order for it to be in direct contact and encapsulates and allows seeing the second cover layer constituted by reflective tapes with retro-reflective elements and the first protective cover layer, and at the same time allows this third extruded polymeric protective cover layer to directly contact said first extruded polymeric protective cover layer.

The third protective cover layer or external layer of transparent polymeric material is applied by extrusion of the melted material between 85° C. and 225° C., at typical process speeds between 3.5 m/min and 100 m/min, giving enough residence time temperature at high temperature to partly melt the polymeric layers covering the reflective tape with retro-reflective elements and to promote their adhesion to the first and third protective cover layers; in addition, no damages result from the exposure time to high temperatures of the micro-prisms structures of the tape with retro-reflective elements.

From the high pressure extrusion of the third protective cover layer of transparent polymeric material and the empty surface between the tracks in the tape with retro-reflective elements, the contact among both extruded polymeric layers will promote the firm adhesion therebetween, and also, the retro-reflective tapes are embedded by a polymeric material partly melting by the heat effect of the third extruded protective cover layer, and besides, this coating is compatible with the third and first TPU layers, which is a requirement for external of cable external covers according to the corresponding product specifications.

The process for manufacturing the electric and/or telecommunications cables having retro-reflective integral covers to be used in harsh environments with low or null visibility of the present invention, consists of applying by extrusion a polymeric material (polymeric composition with or without a pigment), to form a first protective inner cover layer of transparent color or of any opaque or translucent solid color onto the electric energy cable bundle and/or onto a telecommunications cable bundle.

Once the first cover layer is extruded, at least one tape is directly applied onto it, including the visible external light retro-reflective elements, thereby forming a second cover layer. The reflective tapes with retro-reflective elements may or may not include one or more chromatic forms and shades. The retro-reflective tapes are composed by reflective micro-prisms distributed on a surface, and they are covered with a protective layer of different polymeric bases as mentioned above and encapsulating the micro-prisms arranged in these tapes.

Finally, a third protective cover layer from a transparent polymeric material (transparent polymeric composition) is applied on the reflective tapes with retro-reflective elements by extrusion.

Figure 11:
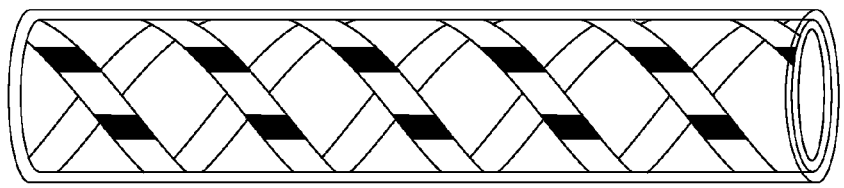
FIG. 11 is a perspective view of an electric and/or telecommunications cable arrangement having retro-reflective integral covers to be used in harsh environments with low or null visibility, built according to a ninth additional embodiment of the present invention.

In FIG. 11, a block diagram of the process of the present invention is shown, which consists of a first drying step 100 of the polymeric material (polymeric composition with or without a pigment) to be processed. Once the polymeric material is dry, the polymeric composition is fed for the body of the first protective cover layer with or without the pigment to an extrusion equipment, and it is subjected to an extrusion step 200 in a main extruder wherein the material is processed at a temperature from 85° C. to 225° C. and at a pressure in the extrusion header between 105 bar to 245 bar (1500 psi to 3500 psi).

Once the first protective cover layer is extruded, the obtained product is fed to taping step 300 to incorporate at least one reflective tape with retro-reflective elements on the first protective cover layer so as to form a second cover layer, using a taping machine incorporating at least one reflective tape with retro-reflective elements on the first protective cover layer according to the required array.

Once the product already has the reflective tapes with retro-reflective elements applied on the first protective cover layer, it is fed to a final extrusion step 400 together with a translucent or transparent polymeric composition, to carry out the extrusion of the third protective cover layer. Temperatures in the extruder are between 85° C. and 225° C. and the pressure in the extrusion header is from 105 bar to 245 bar (1500 psi to 3500 psi).

The product obtained from this extrusion process has excellent physical characteristics for the application of integral covers with retro-reflective tapes in electric and/or telecommunications cable arrays, which are used in dark and/or harsh environments, such as: subsurface mines, mine galleries, underwater facilities, roofed parking lots, petrochemical plants, thermoelectric facilities, hydroelectric power stations, nuclear power plants, subsurface sub-stations and stations, etc., or in another kind of applications.

Table (II) shows the average values having the covers obtained with the above procedure, using a TPU monolayer covering compared to the measurements performed in an integral cover with retro-reflective elements, carrying out measurements in both the inner layer and the external layer, both made of TPU material, this is to be used in electric and/or telecommunications cable covers of the present invention and compared to the requirements to be met of an extra heavy duty cover according to the ICEA S 75 381 standard.

TABLE II

Results obtained in evaluations of TPU monolayer and TPU integral covers with retro-reflective elements, comparative evaluation with respect to a cover of XHD type according to the standard ICEA S-75 381.
TYPICAL CHARACTERISTICS OF EXTRA HEAVY DUTY COVERS OF THERMOPLASTIC POLYURETHANE, AS MONOLAYER AND AS INTEGRAL COVER WITH RETRO-REFLECTING ELEMENTS

| | Cover type | | | | |
|---|---|---|---|---|---|
| | Monolayer covers for extra heavy duty of thermoplastic polyurethane | | Integral covers with retro-reflective elements for extra heavy duty of thermoplastic polyurethane | | |
| Characteristic | Requirements of ICEA S-75 381 standard | Typical values in laboratory Monolayer cover | Requirements of ICEA S-75 381 standard | Typical values in laboratory Inner cover | Typical values in laboratory External cover |
| Before aging in hot air furnace | | | | | |
| Tensile stress, psi | ≥3 700 | 5 435 | ≥3 700 | 6 411 | 5 914 |
| 200% Elongation modulus at, psi | ≥800 | 1 300 | ≥800 | 1 153 | 1 187 |
| Elongation at breakage, % | ≥400 | 538 | ≥400 | 583 | 601 |
| Tearing resistance, lb-in | ≥80 | 146 | ≥80 | 146 | 144 |
| After aging in air furnace at 100° C., 168 hours | | | | | |
| Tensile stress retention, % | ≥50 | 95 | ≥50 | 84 | 91 |
| Elongation retention at breakage, % | ≥75 | 98 | ≥75 | 114 | 112 |
| After aging by oil immersion at 121° C., 18 hours | | | | | |
| Tension stress retention, % | ≥60 | 91 | ≥60 | 79 | 87 |
| Elongation retention at breakage, % | ≥60 | 91 | ≥60 | 119 | 110 |

Reflective tapes with retro-reflective elements applied have a retro-reflexion coefficient (RA) as is shown in Table (III), these measurements were performed based on the standards ASTM E 809 and ASTM E 810. The (RA) is a measure indicating the efficiency of the amount of light reflected to the emitter based on the quantity of light impacting these elements.

TABLE III

RA values measured at the inlet and observation angles specified in the ASTM E809 and ASTM E 810 standards, for the retro-reflective tapes.

| Inlet angle | Observation angle | Typical $R_A$ in tape | Minimum $R_A$ |
|---|---|---|---|
| +5.0° | 0.2° | 700 | 330. |

Table (III) indicates that the employed tapes comply and exceed the efficiency of retro-reflected light in more than 100%, which makes these elements some high efficiency devices in brilliance by retro-reflection, and which exceed the minimum efficiency required to be employed as signaling elements in lighting unfavorable conditions.

When installing mine cables with integral retro-reflective covers, tests were carried out at installation sites (mines) with diverse types of lighting: low intensity light sources (lamps of mining helmets), medium intensity light sources (lighting spots from working vehicles) and intense light sources (sunlight). The identification of the cables by retro-reflectance was optimum at distances up to 100 meters with the average and intense light sources, and it was optimum up to 50 meters when low intensity light sources were used. The comparison of these cables with retro-reflective covers with those mine cables not having this system, resulted in that from 30 meters in medium and intense lighting conditions and from 20 meters in low intensity lighting, the non-retroreflective cables were not distinguishable in the installation site, on the contrary, the retro-reflective cables of the present invention, apart from being visible, the brilliance and diverse chromatic effects exposed to the lighting, allow and favor their location and distinction from the type of cable in question.

The difference with respect to the solution options for harsh environments with low or null visibility, is that the present invention enables a firm adhesion among all the constitutive layers of the composed cover of the cable, resulting in an integral cover assemble fulfilling the standards of cable covers for extra heavy duty (XHD) described in the product ICEA S 75 381 standard, where the compliance to these requirements implies that the cover produced is resistant to present stresses in extremely harsh environments, such as mines, where the cables are subjected to harsh tension, torsion, inflection, abrasion and crushing uses; at the same time allowing a fast and easy identification of the cable, since this has high light reflectivity (retro-reflectance) before any incidence angle of visible light, as well as diverse chromatic combinations capable of being associated to each type of cable on which it is applied for a fast identification of the cable to be revised.

Cover materials where this application may be applied include all rubber or thermoplastic elastomers (TPE) such as polyesther based polyether based or diisocyanates based TPU for an improvement of the stability to light, styrene-butadiene-styrene based TPE (SBS), polyolefins based TPE (TPO), vulcanized TPE (TPV), copolymers based TPE of the type ethylene-propylene, ethylene-butadiene. Preferably, considering the physical-mechanical characteristics, and those of resistance to harsh environments, the material known as thermoplastic Polyurethane (TPU) is the one preferably used in this invention, in both the first protective cover layer and the third protective cover layer, although the use of other polymeric materials as a third protective cover layer is possible, with such a transparency or translucency that allows the visualization of the first and second cover layers.

Another advantage of the present invention is that the thermoplastic rubber used requires no-vulcanization process at high pressure and temperature, thereby eliminating one step in the production chain, resulting in a less energetic consumption process, higher production speed and, finally, a lower cost compared to a TPU vulcanized material.

While preferred embodiments of the invention have been described and shown in the above description, emphasis should be made on the several possible modifications thereto, such as the use of different polymeric compositions in the first and third protective cover layers, without departing from the true scope of the invention; therefore, the present invention should not be restricted except for what is required by the prior art and by the appended claims.

Having described the invention, it is considered a novelty and the contents are therefore claimed in the following claims:

1. Electric and/or telecommunications cables with retro-reflective integral covers to be used in harsh environments with low or null visibility characterized by comprising a core capable of incorporating a plurality of electric and/or telecommunications conductors, reinforcing elements and/or filler elements; a first protective cover layer wrapping the core; at least one reflective tape including external visible light retro-reflective elements and wrapping the first protective cover layer, so as to form a second cover layer; and, a third protective cover layer wrapping the second cover layer constituted by the reflective tape with retro-reflective elements and the first protective cover layer.

2. Electric and/or telecommunications cables with retro-reflective integral covers to be used in harsh environments with low or null visibility, according to claim 1, wherein the first protective cover layer and the third cover layer are obtained by means of an extrusion process incorporating at least one reflective tape with retro-reflective elements forming the second cover layer between both cover layers, thereby forming an integral cover surrounding the core therebetween.

3. Electric and/or telecommunications cables with retro-reflective integral covers to be used in harsh environments with low or null visibility, according to claim 2, wherein the second cover layer includes a reflective tape with retro-reflective elements wrapping the first protective cover layer.

4. Electric and/or telecommunications cables with retro-reflective integral covers to be used in harsh environments with low or null visibility, according to claim 3, wherein the reflective tape with retro-reflective elements is a helically applied monochromatic tape.

5. Electric and/or telecommunications cables with retro-reflective integral covers to be used in harsh environments with low or null visibility, according to claim 3, wherein the reflective tape with retro-reflective elements is a tape with two continuous chromatic shades and helically applied.

6. Electric and/or telecommunications cables with retro-reflective integral covers to be used in harsh environments with low or null visibility, according to claim 3, wherein the reflective tape with retro-reflective elements is a tape with two intermittent chromatic shades and is helically applied.

7. Electric and/or telecommunications cables with retro-reflective integral covers to be used in harsh environments with low or null visibility, according to claim 3, wherein the reflective tape is longitudinally or intermittently applied with alternated and defined areas on the first cover layer, or by means of any another array which guarantees observation thereof at the same deposition level as the first cover layer.

8. Electric and/or telecommunications cables with retro-reflective integral covers to be used in harsh environments with low or null visibility, according to claim 3, wherein the first protective cover layer consists of a polymeric material or composition with or without a pigment forming a layer of transparent color or of any opaque or translucent solid color; the second cover layer constituted by the reflective tape including the retro-reflective elements is helically applied on the first protective cover layer, such that empty spaces between each section of tape track are formed; and, on the reflective tape with retro-reflective elements and the first protective cover layer, the third protective cover layer consisting of a layer of transparent or translucent polymeric material or composition is applied, such that once extruded, it allows visibility of the first protective cover layer and the reflective tape with retro-reflective elements.

9. Electric and/or telecommunications cables with retro-reflective integral covers to be used in harsh environments with low or null visibility, according to claim 8, wherein the polymeric material of the first protective cover layer is selected from CPE (chlorinated polyethylene), CR (Polychloroprene), CSM (chloro-sulphonated Polyethylene), NBR-PVC (Acrylonitrile butadiene-styrene/polyvinyl chloride), TPU (thermoplastic Polyurethane), PE (polyethylene), PP (polypropylene), and/or PVC (Polyvinyl Chloride); preferably using TPU (thermoplastic Polyurethane).

10. Electric and/or telecommunications cables with retro-reflective integral covers to be used in harsh environments with low or null visibility, according to claim 8, wherein the reflective tape with retro-reflective elements is a commercial tape having the trademark HIGH GLOSS manufactured by the 3M Company and having a coating in the front and back zones of syndiotactic polymers, to provide anti-slipping electrostatic adhesion for their fixing on the first cover layer, at the same time protecting from high temperature and pressure by extrusion deposition of the transparent polymeric material external layer.

11. Electric and/or telecommunications cables with retro-reflective integral covers to be used in harsh environments with low or null visibility, according to claim 10, wherein the reflective tape with retro-reflective elements can be of a single color, of chromatic effects alternated on each tape or of dual-tape in a mesh crossed-over shape, such that empty spaces exist on the surface of the second cover layer, wherein the polymeric material constituting the first cover layer is exposed in order to visually identify this inner layer, such that the reflective tape coating with retro-reflective elements occupies up to 91% of the surface on which it is deposited, such that the empty space for a close contact between the first cover layer and the third cover layer is 9% of the external area corresponding to the first layer.

12. Electric and/or telecommunications cables with retro-reflective integral covers to be used in harsh environments with low or null visibility, according to claim 11, wherein the distance between the tape tracks is at least 20% of the width of the applied tape.

13. Electric and/or telecommunications cables with retro-reflective integral covers to be used in harsh environments with low or null visibility, according to claim 8, wherein the third protective cover layer is a TPU polymeric composition (thermoplastic Polyurethane) which conducts visible light and is extruded under high pressure (high adherence extrusion) in order to integrally encapsulate and enable seeing the second cover layer constituted by reflective tapes with retro-reflective elements and the first protective cover layer, further allowing this third protective cover layer to be in direct contact with said first protective cover layer.

14. Electric and/or telecommunications cables with retro-reflective integral covers to be used in harsh environments with low or null visibility, according to claim 8, wherein the third protective cover layer is selected from PE (polyethylene), PA (polyamides), PP (polypropylene), PVC (polyvinyl chloride) and/or Polyester, such that once extruded, it allows visibility of the first protective cover layer and the reflective tape with retro-reflective elements.

15. Electric and/or telecommunications cables with retro-reflective integral covers to be used in harsh environments with low or null visibility, according to claim 2, wherein the second cover layer includes a pair of reflective tapes with retro-reflective elements wrapping the first protective cover layer.

16. Electric and/or telecommunications cables with retro-reflective integral covers to be used in harsh environments with low or null visibility, according to claim 15, wherein the reflective tapes with retro-reflective elements are two helically and counter-currently applied monochromatic tapes, such that they crossover each other.

17. Electric and/or telecommunications cables with retro-reflective integral covers to be used in harsh environments with low or null visibility, according to claim 15, wherein the reflective tapes with retro-reflective elements are two tapes with two continuous chromatic shades each, helically and counter-currently applied, such that they crossover each other.

18. Electric and/or telecommunications cables with retro-reflective integral covers to be used in harsh environments with low or null visibility, according to claim 15, wherein the reflective tapes with retro-reflective elements are two tapes with two intermittent chromatic shades each, helically and counter-currently applied, such that they crossover each other.

19. Electric and/or telecommunications cables with retro-reflective integral covers to be used in harsh environments with low or null visibility, according to claim 15, wherein the reflective tapes with retro-reflective elements are one tape with two intermittent chromatic shades and one tape with two continuous chromatic shades, helically and counter-currently applied, such that they crossover each other.

20. Electric and/or telecommunications cables with retro-reflective integral covers to be used in harsh environments with low or null visibility, according to claim 15, wherein the reflective tapes with retro-reflective elements are a monochromatic tape and one tape with two continuous chromatic shades, helically and counter-currently applied, such that they crossover each other.

21. Electric and/or telecommunications cables with retro-reflective integral covers to be used in harsh environments with low or null visibility, according to claim 15, wherein the reflective tapes with retro-reflective elements are one monochromatic tape and a tape with two intermittent chromatic shades, helically and counter-currently applied, such that they crossover each other.

22. Electric and/or telecommunications cables with retro-reflective integral covers to be used in harsh environments with low or null visibility, according to claim 15, wherein the reflective tapes with retro-reflective elements are longitudinally or intermittently applied with alternated and defined areas on the first cover layer, or by means of any another array which guarantees observation thereof at the same deposition level as the first cover layer.

23. Electric and/or telecommunications cables with retro-reflective integral covers to be used in harsh environments with low or null visibility, according to claim 15, wherein the first protective cover layer consists of a polymeric material or composition with or without a pigment, forming a layer of transparent color or of any opaque or translucent solid color; the second cover layer is constituted by two reflective tapes including the retro-reflective elements, helically and counter-currently arranged, such that they crossover each other on the first cover layer, such that empty spaces between each section of tape or track are formed; and, on the reflective tapes with retro-reflective elements and the first protective cover layer, the third protective cover layer consisting of a layer of transparent or translucent polymeric material is applied, such that once extruded, it allows the visibility of the first protective cover layer and the reflective tapes with retro-reflective elements.

24. Electric and/or telecommunications cables with retro-reflective integral covers to be used in harsh environments with low or null visibility, according to claim 1, wherein the cables have remote identification by retro-reflectance up to 100 meters with intense and medium light sources; and up to 50 meters with low intensity light sources.

25. A process for manufacturing electric and/or telecommunications cables having retro-reflective integral covers to be used in harsh environments with low or null visibility, characterized by comprising a first drying step of the polymeric material or composition with or without a pigment to be processed; once the material is dried, the polymeric composition is fed for the body of the first cover layer with or without the pigment to an extrusion equipment and it is subjected to an extrusion step wherein the material is processed at a temperature from 85° C. to 225° C. and at a pressure at the extrusion header from 105 bar to 245 bar (1500 psi to 3500 psi); once the first cover layer has been extruded, the obtained product is fed to a taping step in order to incorporate at least one reflective tape with retro-reflective elements on the first cover layer, for which a taping machine incorporating at least one retro-reflective tape on the first cover layer according to the required array is used; once the product already has at least one tape applied, it is subjected to a final extrusion step together with a transparent polymeric composition, to carry out the extrusion of the third cover layer at temperatures in the extruder from 85° C. to 225° C. and at a pressure in the extrusion header from 105 bar to 245 bar (1500 psi to 3500 psi).

26. A process for manufacturing electric and/or telecommunications cables having retro-reflective integral covers to be used in harsh environments with low or null visibility, according to claim 25, wherein the polymeric material or polymeric composition with or without a pigment of the first protective cover layer forms a layer of transparent color or of any opaque or translucent solid color and is selected from CPE (chlorinated polyethylene), CR (Polychloroprene), CSM (chloro-sulphonated Polyethylene), NBR-PVC (Acrylonitrile butadiene-styrene/polyvinyl chloride), TPU (thermoplastic Polyurethane), PE (polyethylene), PP (polypropylene), and/or PVC (Polyvinyl Chloride).

27. A process for manufacturing electric and/or telecommunications cables having retro-reflective integral covers to be used in harsh environments with low or null visibility, according to claim 25, wherein the polymeric composition of the first protective cover layer preferably consists of TPU (thermoplastic Polyurethane); the second cover layer constituted by at least one reflective tape with retro-reflective elements, is a commercial tape having the trademark HIGH GLOSS manufactured by 3M Company; and the polymeric composition of the third protective cover layer preferably consists of TPU (thermoplastic Polyurethane), such that once extruded, it allows visibility of the first protective cover layer and the tape with retro-reflective elements.

28. A process for manufacturing electric and/or telecommunications cables having retro-reflective integral covers to be used in harsh environments with low or null visibility, according to claim 27, wherein the obtained product has excellent physical characteristics for the application of reflective tapes covers with retro-reflective elements in electric and/or telecommunications cable arrays, which are used in dark and/or harsh environments, such as: subsurface mines, mine galleries, underwater facilities, roofed parking lots, petrochemical plants, thermoelectric facilities, hydroelectric power stations, nuclear power plants, subsurface sub-stations and stations, etc.

29. A process for manufacturing electric and/or telecommunications cables having retro-reflective integral covers to be used in harsh environments with low or null visibility, according to claim 27 wherein the polymeric composition of the third protective cover layer is selected from PE (polyethylene), PA (polyamides), PP (polypropylene), PVC (polyvinyl chloride) and/or Polyester, such that once extruded, it allows visibility of the first protective cover layer and the reflective tape with retro-reflective elements.

\* \* \* \* \*